United States Patent [19]

Anderson et al.

[11] Patent Number: 4,460,960

[45] Date of Patent: Jul. 17, 1984

[54] TRANSACTION EXECUTION SYSTEM HAVING KEYBOARD AND MESSAGE CUSTOMIZATION, IMPROVED KEY FUNCTION VERSATILITY AND MESSAGE SEGMENTATION

[75] Inventors: Robert W. Anderson, Morgan Hill; May L. Gee, San Jose, both of Calif.; Alice K. McMullen, Charlotte, N.C.

[73] Assignee: International Business Machines Corporation, Armonk, N.Y.

[21] Appl. No.: 311,373

[22] Filed: Oct. 14, 1981

Related U.S. Application Data

[62] Division of Ser. No. 9,384, Feb. 2, 1979, Pat. No. 4,319,336.

[51] Int. Cl.³ .................. G06F 3/023; G06F 3/04; G06F 3/14
[52] U.S. Cl. .................. 364/200; 364/900
[58] Field of Search .................. 340/825.55, 711; 235/380, 381; 364/200, 900

[56] References Cited

U.S. PATENT DOCUMENTS 3,852,571 12/1974 Hall et al. .................. 235/379
4,134,537 1/1979 Glaser et al. .................. 235/381
4,186,871 2/1980 Anderson et al. .................. 235/380

Primary Examiner—Harvey E. Springborn
Attorney, Agent, or Firm—Shelley M. Beckstrand

[57] ABSTRACT

Key initiated transaction requests at a terminal remote from and in communication with a host data processing system are processed at the terminal under the selective control of the host. Each active transaction key at the terminal keyboard is assigned one of three different states. Transactions requested by keys assigned a standard state are processed at the terminal without further data input being required of the customer. Transactions requested by keys having a data entry state are also handled within the terminal and with the additional customer entered data required to complete the transaction being requested by and received by the terminal using sets of messages previously stored in the terminal by the host data processing system. Transactions designated by an interactive key state take place within and involve communication of interactive start, display, response, and completion messages, and of transaction request, reply, and status messages between both the terminal and the host, enabling the responses and other communications generated by the host in connection with a transaction for a particular customer to be customized.

21 Claims, 13 Drawing Figures

FIG. 9

TRANSACTION REQUEST MESSAGE FORMAT

| L | N | C | SC | V A R | PIN | FAS | F S | TAS | F S | S P T | AMT | MX | F S |
|---|---|---|---|---|---|---|---|---|---|---|---|---|---|
| 1 | 1 | 1 | 1 | 1 | 8 | 0-21 | 1 | 0-21 | 1 | 0-1 | 0-10 | 0-1 | 1 |
| 250 | 252 | 254 | 256 | 258 | 260 | 262 | 264 | 266 | 268 | 270 | 272 | 274 | 276 |

| T2 DATA | F S | MFLAG | PIN TRY | T3 DATA MAP | T3 DATA | F S | LID-IMI | F S | TRS | F S |
|---|---|---|---|---|---|---|---|---|---|---|
| 0-19 | 1 | 1 | 1 | 0,2 | 0-52 | 1 | 2 | 1 | 1-21 | 1 |
| 278 | 280 | 282 | 284 | 286 | 288 | 290 | 292 | 294 | 296 | 298 |

FIG. 15

PAGE DESCRIPTION FIELDS OF INTERACTIVE DISPLAY MESSAGE

| TEXT STREAM LENGTH | TEXT & DISPLAY FORMAT CONTROLS | RS CODE POINT X'28' | RES SEG ID | TEXT & DISPLAY FORMAT CONTROLS | CDES CODE POINT X'29' | TEXT & DISPLAY FORMAT CONTROLS |
|---|---|---|---|---|---|---|
| 1 | VAR | 1 | 1 | VAR | 1 | VAR |
| 490 | 492 | 498 | 500 | 494 | 502 | 496 |

TEXT STREAM

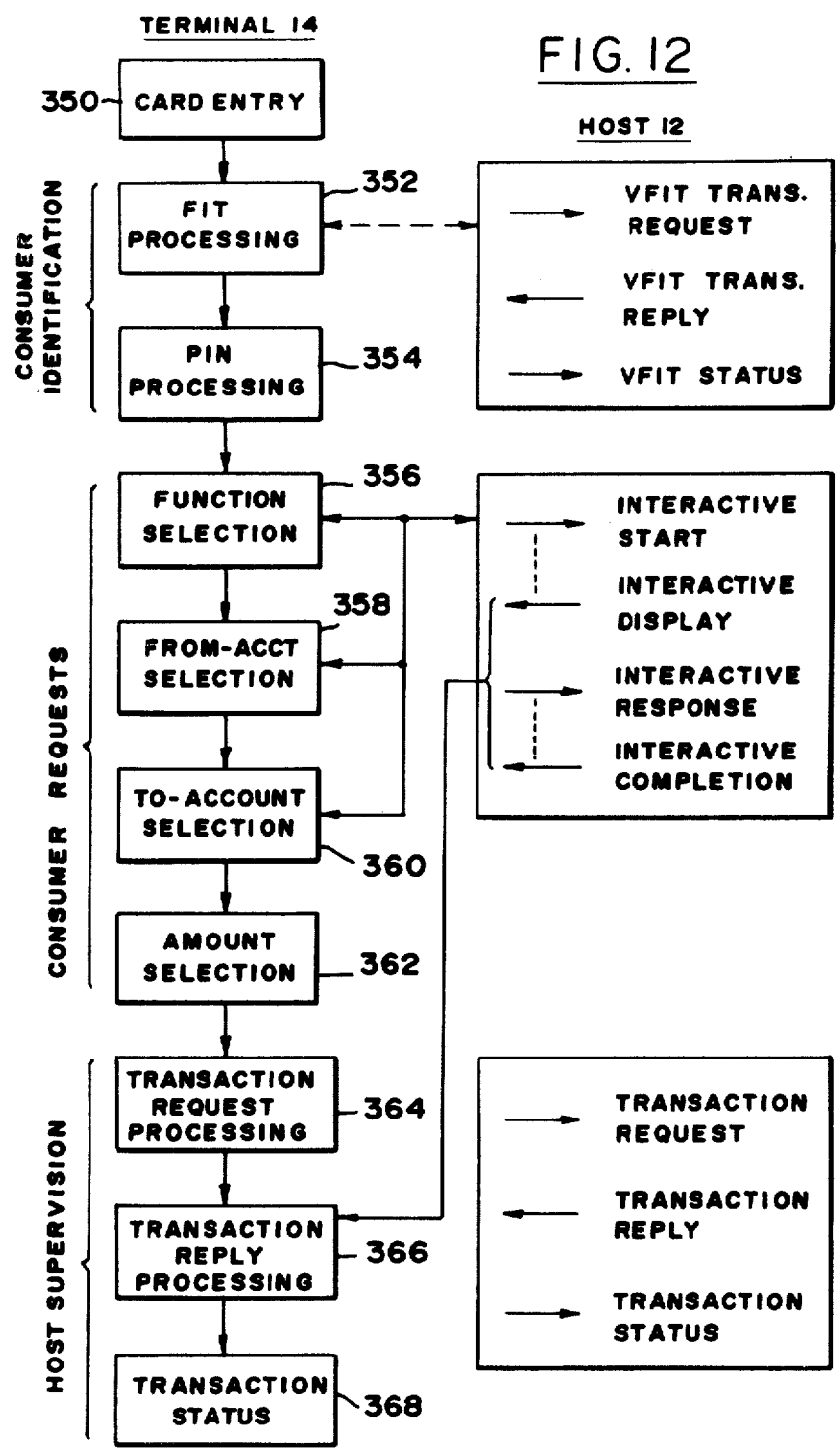

FIG.13
INTERACTIVE START MESSAGE TO HOST

| LSN | C | SC | VAR | TSN PIN | PIN TRY | FLAG | TRANS SC | INTERACTIVE KEY | LID-IMI | FS | T-2 DATA | FS | T-3 MAP | T-3 DATA | FS |
|---|---|---|---|---|---|---|---|---|---|---|---|---|---|---|---|
| 380 | 384 | 386 | 388 | 390 | 392 | 394 | 396 | 398 | 400 | 402 | 404 | 406 | 408 | 410 | 412 | 414 |
| 382 | | | | | | | | | | | | | | | | |

FIG.14
INTERACTIVE DISPLAY MESSAGE TO TERMINAL

| LSN | C | SC | VAR | ID MSG FLAG | MIN CDEL | MAX CDEL | LP | PAGE FLAG | PAGE DATA | PAGE FLAG | PAGE DATA | ... |
|---|---|---|---|---|---|---|---|---|---|---|---|---|
| 440 | 444 | 446 | 448 | 450 | 452 | 454 | 456 | 458 | 460 | | 462 | 464 |
| 442 | | | | | | | | | PAGE 1 | | PAGE N | |

| VALIDATION DATA | LS | SUBSTITUTION DATA | PAD |
|---|---|---|---|
| 466 | 468 | 470 | |

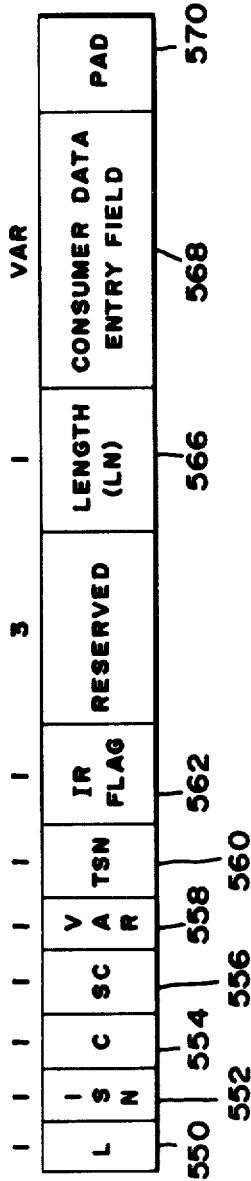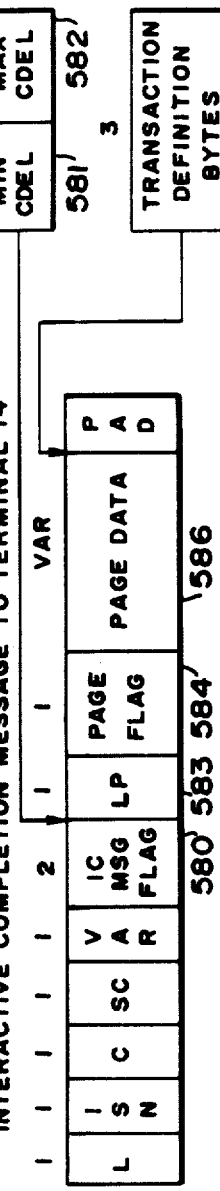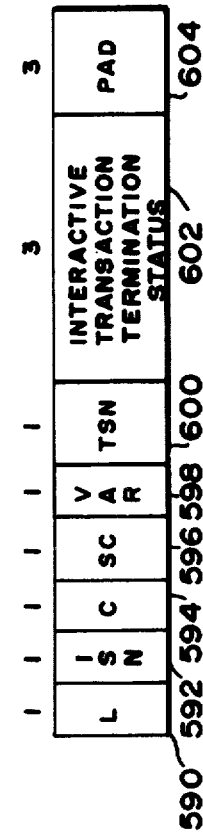

FIG. 21

CHANGE DISPLAY MESSAGE COMMAND FORMAT

| L | N | C | SC | C2 | C/SC | CI | SPEC | MN | ML | MSG | FLAG | IMI |
|---|---|---|----|----|------|----|------|----|----|-----|------|-----|
| 750 | 752 | 754 | 756 | 758 | 760 | 762 | 764 | 766 | 768 | 770 | 772 | 774 |

VAR

TRANSACTION EXECUTION SYSTEM HAVING KEYBOARD AND MESSAGE CUSTOMIZATION, IMPROVED KEY FUNCTION VERSATILITY AND MESSAGE SEGMENTATION

This is a division of application Ser. No. 06/009,384 filed 02/02/79. now U.S. Pat. No. 4,319,336.

BACKGROUND OF THE INVENTION

1. Field of the Invention

This invention relates to transaction execution systems, and more particularly to such systems having a central data base at a host data processing system in communication with remote terminals to permit the execution of transactions such as the issuance of cash or the inter-account transfer of funds in response to entry of a personal identification number together with a machine-readable identification card issued by any one of a plurality of cooperating institutions.

2. History of the Prior Art

Transaction execution systems which enable the performance of transactions such as cash issuance at terminals remote from and in communication with a host data processing system having a central data base in which account and other information is stored are well known. Examples of such systems are provided by U.S. Pat. No. 3,956,615 of Anderson et al, 3,970,992 of Boothroyd et al, 3,937,925 of Boothroyd, 3,931,497 of Gentile et al, 4,004,134 of Hwang, 4,023,014 of Goldberg, 4,025,760 of Trenkamp, 4,023,013 of Kinker, 3,727,186 of Stephenson, Jr., et al, 4,091,448 of Clausing, and U.S. Pat. No. 4,186,871 of Anderson et al.

The various transaction execution systems described in the above-noted patents and application constitute a variety of different approaches to the problem of providing a secure and yet versatile transaction to take place at any one of the terminals remote from the host data processing system. For example, in U.S. Pat. No. 3,956,615 of Anderson et al which is commonly assigned with the present application, various transactions are performed at the terminal upon verification of the propriety of the transaction and the authenticity of the consumer based on entry of a credit card identifying the consumer and an issuing financial institution and entry of a personal identification number (PIN) by the consumer. The system verifies the personal identification number with identification information on the credit card using an encryption code determined by the financial institution identified by the card. In an improvement on that system which is described in U.S. Pat. No. 4,186,871 of Anderson et al, the host data processing system includes a virtual financial institution table (VFIT). Upon entry by a consumer of a credit card and personal identification number the financial institution table (FIT) within the terminal is searched in an attempt to locate an entry corresponding to the institution identified by the credit card. If a corresponding entry is located, data from the fields for that entry is used to encrypt the personal data from the credit card for purposes of verification of the personal identification number entered by the consumer. If a corresponding entry is not located in the financial institution table, a search of the virtual financial institution table at the host is made. If a corresponding entry is located in the virtual financial institution table, the included data is communicated back to the terminal where it is used in the verification of the personal identification number. The Clausing patent provides an example of a system where time sharing of a central processor or a local processor serving one or a handful of terminals is utilized to execute transaction requests. In the former case transactions are executed at the central processor on an on-line basis, while in the latter case transactions are executed at the regional or local processor on an off-line basis.

Transaction execution systems provide one solution to the persistent problem of how to provide the customers of a financial institution with more functions without substantially increasing costs. Such systems attempt to solve this problem by automating simple functions like cash withdrawal, deposit and the like so as to reduce the time that the customer must spend with a teller. This reduces the number of tellers an institution needs, and accordingly the costs. If the transaction execution system can provide enough functions, it can even reduce the number of branches of the financial institution which are needed, in addition to extending the institution's banking hours for normal transactions without actually increasing the number of hours that the buildings themselves must be kept open.

Considering these objectives present transaction execution systems suffer from a number of limitations which limit their versatility and applicability to a variety of different situations. For example, conventional systems are limited in the number and types of functions that they can perform. Transactions such as bill paying which require transfer of funds between accounts are extremely difficult if not impossible to perform. Further problems arise from the fact that a financial institution wishing to enable its customers to perform functions different from those permitted by other institutions sharing the same system must typically acquire its own terminal system including controller. This is quite wasteful when it is considered that a number of financial institutions can otherwise share the same terminal system by accepting a standard set of key functions and display messages. The key functions themselves are limited so that even in instances where an institution can customize the available transactions and messages the number and types of functions are still unduly limited. Most systems limit performance of the functions to the terminal level, and in the process fail to provide the type of communication with the terminal or information storage within the terminal which enables such things as repeated interchange of data requests and data entries between the terminal and attached consumer operated keyboards, displays customized for a particular institution or customer and other activities capable of customization for the institution or consumer. Those conventional systems which permit communication between the terminal and the host data processing system during execution of the transactions tend to limit the interchange of information between the two because of such things as time and storage constraints so as to again limit the type and variety of functions capable of being performed. One such problem relates to the transmission of lengthy display messages from the host to the terminal during transaction execution. Because of this problem a number of predetermined standard messages must typically be stored in the terminal during initialization of the system, with the system thereafter relying on the standard messages stored in the terminal for communication with the consumer during execution of the transactions. In such systems the ability to communicate between the host and the consumer on a going, on-line basis and to compose messages custom-designed for a particular consumer or institution is lacking.

Accordingly, it is an object of the invention to provide improved communications and transaction processing protocols for a transaction execution terminal and system.

It is a further object of the invention to provide a transaction execution system capable of greater and more varied functions. This object includes the ability to provide a variety of diverse functions to be performed at the terminal complete with a full interchange of data between the terminal and consumer, as well as the ability to utilize the host data processing system when necessary to accomplish certain functions.

Still further objects in accordance with the invention include the ability to communicate messages between the host and the terminal in simplified form so as to minimize the transmission time involved in addition to the storage space required, particularly at the terminal where messages are desirably stored for use in providing displays to consumers as needed.

BRIEF DESCRIPTION OF THE INVENTION

The present invention provides an improved transaction execution system in which institutional key-initiated transactions and responses to individual consumers can be customized and in which a variety of diverse transactions can be performed at the terminal level or with the active participation of the host data processing system using a minimum of communications and storage for multiline, customized messages. Customization of the keyboards of each financial institution sharing a terminal with other institutions is made possible by a terminal arrangement including a keyboard having a plurality of keys. Various different key states define whether each particular key is active or inactive and, if active, whether it is limited to a simple transaction at the terminal level or can comprise a more complex and versatile function either at the terminal or at the host level. The keyboards of various institutions or pools of institutions sharing a terminal or common processor can be customized in accordance with the key set tables described in U.S. Pat. No. 4,319,336.

The key states which are possible for these keys defined as active rather than inactive include the standard, data entry and interactive states. In the standard state which is confined to execution at the terminal level, communication between the keyboard requesting a transaction and the terminal's processor is limited to verification of the authenticity of the consumer and communication of predefined keys from the keyboard to the terminal's processor. Following that, the terminal executes the transaction requested without further entry of data by the consumer and without display of messages requesting a response by the consumer.

The data entry key state differs from the standard state in enabling extensive and varied communication to occur between the consumer and the terminal following verification of the consumer's authenticity. The terminal selects from among a number of standard, predetermined messages previously stored therein so as to request data entry by the consumer, receive the entered data and, where appropriate, request and receive consumer verification of the consumer entered data upon display thereof by the terminal. The data entered by the consumer as a result of the transaction is stored in the terminal, from which it is transferred to the host at the end of the transaction.

Interactive keys involve repeated communication between the terminal and host with the host being utilized to determine the steps in executing the transaction and to compose messages communicated to the terminal for display to the consumer in connection with the execution of the steps. Involvement of the host and its included data base storing information with respect to various accounts provides for multi-account transactions such as bill paying where funds are transferred from one account to another within the system. Following entry of a credit card and verification of the consumer's authenticity, the consumer selects a function by pressing a key and the terminal responds by sending an interactive start message to the host. The host then sends an interactive display message to the terminal containing messages which are displayed to the consumer. Consumer responses to the messages are communicated to the host in an interactive response message. The host may send further display messages to the terminal in response to an interactive response message, or it may send an interactive completion message. The display messages sent to the terminal by the host may be custom designed by the host or selected from the standard messages stored in the terminal. The sequence of interactive messages beginning with the interactive start message, ending with the interactive completion message and involving one or more series of display and response messages in between occurs for an interactive function key and may thereafter be repeated for other interactive keys operated as part of the transaction such as the keys used to select an account for transfer of funds or the amount of the funds to be transferred. When actuation of the various selection keys for a given transaction is completed, the terminal sends a transaction request to the host containing any necessary data not already provided to the host. The host then sends a reply to the terminal, which may be followed by a status message to the host ending the transaction.

BRIEF DESCRIPTION OF THE DRAWINGS

In the accompanying drawings forming a material part of this disclosure:

FIG. 9 is a diagrammatic representation of a transaction request message generated at the terminal in response to consumer activation of a transaction key in the arrangement of FIG. 1B;

FIG. 12 is an operational flow chart of the basic steps performed by the arrangement of FIG. 1B in executing an interactive key transaction;

FIG. 13 is a diagrammatic representation of an interactive start message from the terminal to the host data processing system in the arrangement of FIG. 1B;

FIG. 14 is a diagrammatic representation of an interactive display message from the host data processing system to the terminal in the arrangement of FIG. 1B;

FIG. 15 is a diagrammatic representation of page description fields within the interactive display message of FIG. 14;

FIG. 16 is a diagrammatic representation of an interactive response message from the terminal to the host data processing system in the arrangement of FIG. 1B;

FIG. 17 is a diagrammatic representation of an interactive completion message from the host data processing system to the terminal in the arrangement of FIG. 1B;

FIG. 18 is a diagrammatic representation of an interactive status message from the terminal to the host data processing system in the arrangement of FIG. 1B;

FIG. 21 is a diagrammatic representation of a change display message command from the host data processing system to the terminal in the arrangement of FIG. 1B;

This is a division of application Ser. No. 06/009,384, filed 02/02/79, now U.S. Pat. No. 4,319,336, issued Mar. 9, 1982, the teachings of which are incorporated herein in their entirety. The communications protocols and message formats principally claimed herein are described in connection with FIGS. 9-18 and 21. FIG. 12, providing an overview of the communications protocols, is retained in this specification for convenience, along with the following description thereof from U.S. Pat. No. 4,319,336. The references to figures and elements not included herein are references to figures and elements in the parent, U.S. Pat. No. 4,319,336.

INTRODUCTION

Figure 1A:
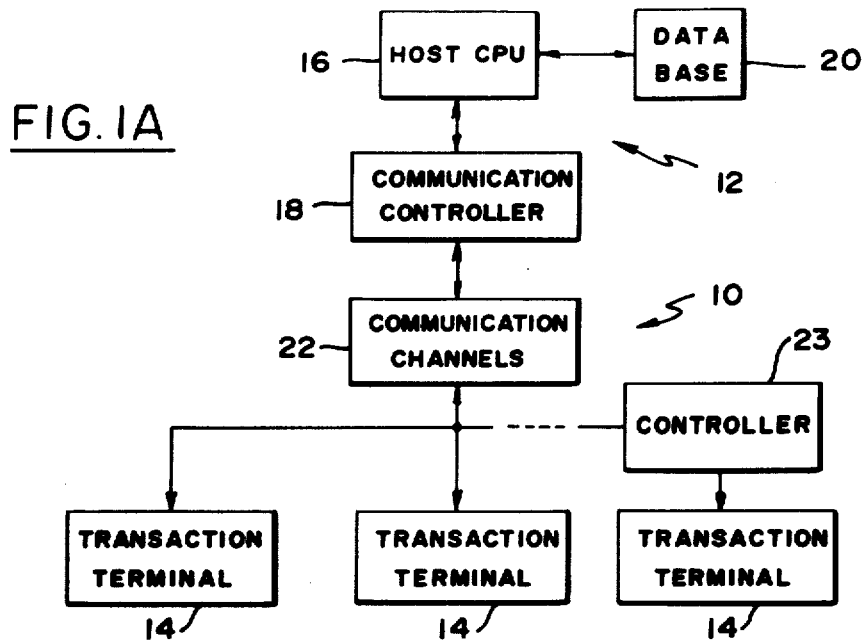
FIG. 1A is a block diagram of a transaction execution system in accordance with the invention.

The keyboard customization option described in U.S. Pat. No. 4,319,336 allows member institutions of an interchange pool using the same terminal or terminal communication loop to specify customer keyboard configurations. This allows institutions to customize processing options within their own card base if there are multiple card classes which are to be treated differently as far as such things as transaction types allowed and accounts to be accessed are concerned. Thus, within a given financial institution sharing a particular terminal, that institution can issue one set of credit cards to a first class of customers authorized to perform a first set of transactions and a second set of credit cards to a second class of customers authorized to perform a different set of transactions but using the same keyboard configuration shown in FIG. 4. Moreover, each institution sharing a given terminal can specify processing options differently from the base processing options provided by the base key set table 104 or from the custom processing options of other sharing institutions. A still further advantage resides in the fact that institutions can share processing options for common card classes which differ from the processing options specified by the base key set table 104. For example, three institutions may want to treat their credit card customers in the same way using the same processing option which differ from the base key set table 104. This alternate set of processing options need only be specified once during initialization of the various tables within the terminal 14 and thereafter is accessible to all three institutions. An institution identifier on the customer identification card may be used to access the key set tables, thus personalizing the keyboard to a particular institution or class of customers within that institution.

A better understanding of the operation of the transaction execution system described thus far including the features of keyboard customization and data entry key as well as interactive key described hereafter may be had by considering in detail the format of a transaction request message generated at the terminal toward the end of a transaction. The format of such a message is shown in FIG. 9. The transaction request message transfers the consumer entered data from the terminal to the host. In the case of both a data entry key and an interactive key the transaction request message is sent when the display messages and responses of the various transaction steps are completed.

The first or L field 250 of the transaction request message defines the message length.

A following N field 252 contains the transaction sequence number. When the host 12 is first notified that a transaction is in progress, the transaction sequence number is incremented and placed in the field 252 of the next transaction request message. All succeeding terminal-to-host messages associated with this transaction contain the same transaction sequence number.

The next or C field 254 defines the message class. All transaction request messages have the class X'01'. The next or SC field 256 defines the message subclass. A VAR field 258 defines a varying number which prevents an enciphered personal identification number from appearing on the communication lines as a constant. A following PIN field 260 contains the enciphered personal identification number of the consumer.

A FAS field 262 is present only when one of the four From Account keys 110 has been pressed. The first byte of the field indicates which of the four From Account keys was pressed. If an account number was entered, 1 to 20 bytes follow to identify the account. If the alternate key code function is specified in the key set table, the first byte contains the alternate key code value provided in the key definition for the From Account key depressed. A following FS or field separator field 264 defines the limits of variable length fields.

A TAS field 266 is present only for transactions involving actuation of one of the To Account keys 112. The first byte of the field indicates which of the four To Account keys was pressed. If an account number was entered, 1 to 20 bytes that follow the first byte of the field identify the account number. If the alternate key code function is specified in the key set table, the first byte contains the alternate key code value provided in the key definition for the To Account key depressed. The TAS field 266 is followed by an FS or field separator field 268.

An SPT field 270 is present only if the consumer selected a special transaction key. It contains the special transaction number. A following AMT field 272 is present only for transactions that include an amount. The following MX field 274 is present only for transactions which include dual cash dispensing cartriges at the keyboard. It contains the number of larger denomination bills which must be replaced by smaller denomination bills to produce the desired denominational mix. A field separator field 276 follows.

Following the field separator field 276 is a T2 DATA field 278. This field contains 0 through 19 bytes of data read from track T2 of the consumer's credit card. The data is packed, two digits per byte, and the end-of-card, start-of-card and longitudinal redundancy check digits are not included. This field is present only if T2 data is good as determined by the MFLAG field described hereafter and if the issuing institution entry in the financial institution table 100 specifies that T2 data be sent for this card type. Following a field separator 280 an MFLAG field 282 containing card and personal identification number flags occurs. This is a one byte field containing flags that describe card track status and personal identification number entry requirements and status. Bit 0 of this field set to "1" if T2 was read successfully fully from the card in the terminal. Bit 1 of this field is set to "1" if T3 data was read from the card successfully by the terminal. Bit 2 of the field is set to "1" when the consumer fails to enter a valid personal identification number within the number of entry attempts allowed. Bit 3 of this field is set to "1" when the try count obtained from T3 is 0 and the consumer failed to correctly enter his personal identification number on the single attempt allowed. Bit 4 of this field denotes card reader switch irregularity. The terminal monitors the card reader, and if any switch irregularities are sensed the transaction is aborted. Bit 5 of the field is set to "1" whenever the terminal does not perform personal identification number validation. It is then up to the applications program in the host to validate the consumer personal identification number before authorizing a transaction. Bit 6 of this field is set to "1" if data was detected on both T2 and T3. This bit along with bits 0 and 1 defines the card readability, which information is used by the terminal to access the proper financial institution table entry.

In a following PIN TRY field 284 and indication is provided of the number of personal identification number entry attempts. This field contains the number of PIN entries attempted, including the valid PIN entry, or it contains the number of entries made prior to a time-out or consumer cancel, or PIN entry limit reached. A following T3 DATA MAP field 286 is present if the T3 data was determined to be good in the MFLAG field 282 and if the issuing institution's financial institution table specifies that T3 data be sent for this card type. This field is a copy of the T3 MAP or T23 MAP field from the financial institution table entry. The field further specifies whether the entire T3 content is contained in a following T3 DATA field 288, or otherwise which fields from the card are contained in the T3 DATA field 288. In the DATA data field 288 which is present only if the T3 DATA MAP field 286 is present selected data from T3 is contained. The data characters are packed, two per byte. The card control characters for start-of-card, end-of-card and longitudinal redundancy check are not included as the terminal has already performed card data checks prior to accepting the consumer's card.

Following a field separator 290 an LID-IMI field 292 occurs. The field 292 contains the two byte language table entry identifier field used for this cardholder for the multilanguage option. Bits 0-7 of this field define the LID which is the language ID value obtained either from the financial institution table entry being used or from the credit card or from a consumer choice. Bits 8-15 of this field define the IMI or institution message identifier obtained from the financial institution table entry being used.

Following a field separator 294 a TRS or transaction selection field 296 indicates which of the 8 Function keys 108 was pressed and, if a Function key is defined as data entry, the indication is followed by up to 20 digits. If the alternate key code function is specified in the key set table, the first byte of this field contains the alternate key code value provided in the key definition for the Function key depressed. The TRS field 296 is followed by a field separator 298 which ends the transaction request message.

Figure 1B:
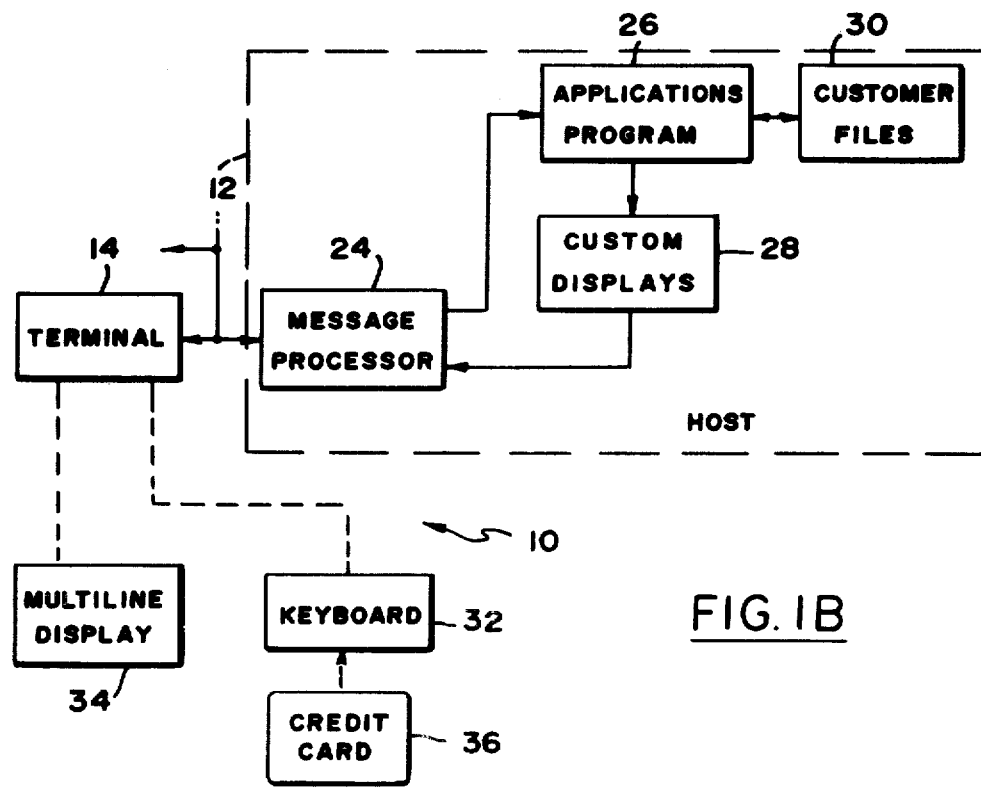
FIG. 1B is a more detailed block diagram of a transaction terminal and the host data processing system of the system of FIG. 1A.

As previously noted in connection with FIG. 1B the applications program 26 within the host data processing system 12 provides display messages during an interactive transaction to the terminal 14. Data entry keys use standard, predetermined messages stored in the terminal 14 during initialization. Messages defining the displays to be used in the execution of a transaction are organized by the applications program 26 into selection groups. A selection group may be defined as a set of hierarchically-organized data which describes the total range of options available to a consumer at a transaction step, for a particular key. For interactive keys, selection group data is requested from the host 12 when the consumer begins an interactive sequence for that transaction step by hitting an interactive key. The applications program 26 tailors the selection group data according to the transaction step during which the interaction is occurring and optionally uses information about the consumer who has started the transaction to further customize the data transmitted.

Selection group data is divided into smaller units called selection sets. A selection group for interactive keys typically consists of many selection sets. For data entry keys, a selection group consists of just one selection set. Since the display information resides at the terminal 14 in the case of an data entry key and is not customized to the consumer, the information must be more general and categorical in nature. Since standard keys require no additional data entry once the key has been entered, there is no need to provide selection groups for these keys.

Figure 10:
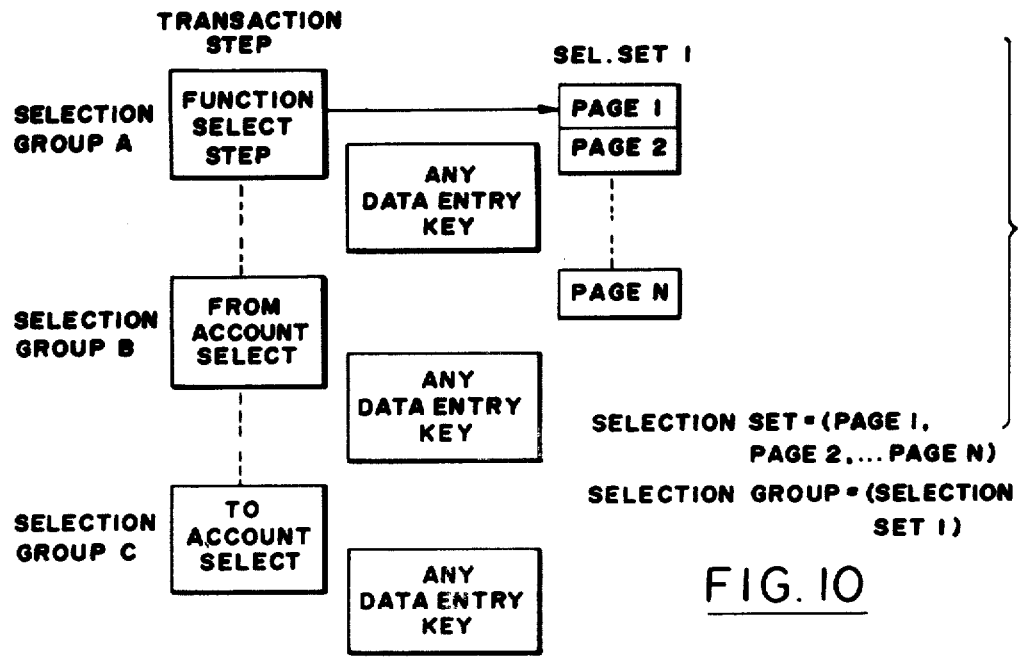
FIG. 10 is an operational block diagram representation of the data organization in an expanded key transaction.

FIG. 10 depicts the data organization for data entry keys. A different selection group is associated with each of the sixteen different transaction keys. Thus, a selection group A is associated with a Function key 108 defined as having a data entry state. A selection group B is associated with a From Account key 110 defined as having the data entry state. A selection group C is associated with a To Account key 112 assigned the data entry state. As noted above, in the case of data entry keys, each selection group has just one selection set. In the case of selection group A, this selection group consists of selection set 1 which includes pages 1 through N. A selection set can consist of a single page of display or as many pages as are necessary to present a complete message. Selection groups B and C each have a single selection set which is not shown in FIG. 10 for reasons of brevity.

When a data entry key is actuated by a consumer, the terminal 14 displays a page of information which is taken from selection set 1 if a Function key has been actuated. The consumer may respond by actuating the CHANGE key which indicates that another page of information from selection set 1 should be display, or by entering numeric data which indicates a selection of an item from the list displayed. Thus, many selection sets will consist of more than one page, and depending on the function the first page may present the consumer with a plurality of options with the options being continued on a second and perhaps subsequent pages because of the space required to list the options. If a verification step is indicated, the terminal 14 responds to consumer entry of numeric data by displaying a verification page to the consumer. If the consumer indicates that the information entered is correct, the data collected at the terminal 14 is saved and the terminal proceeds to the next transaction step. The data collected in this manner is transmitted to the host 12 with other transaction information as part of the transaction request message.

INTERACTIVE KEY OPERATION INCLUDING CUSTOMIZED DISPLAY MESSAGES FROM HOST

Figure 11:
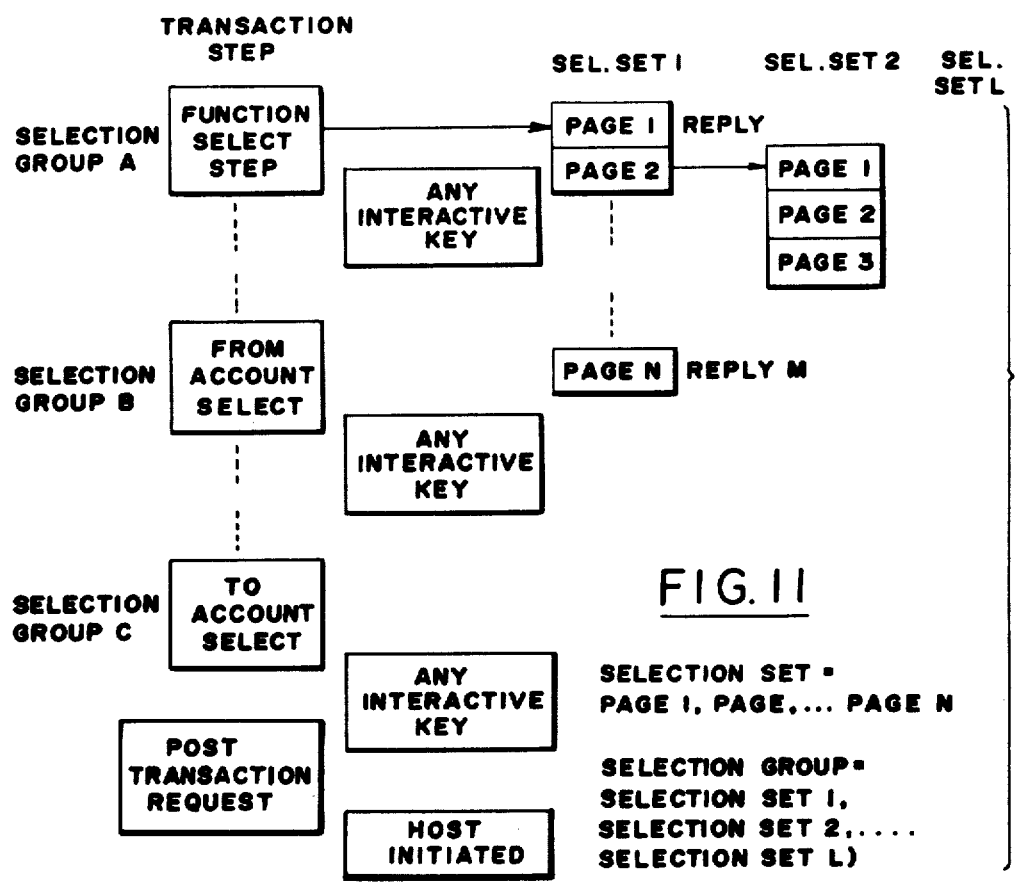
FIG. 11 is an operational block diagram representation of the data organization in an interactive key transaction.

FIG. 11 depicts the data organization for interactive keys. As in the case of FIG. 10 there is a different selection group associated with each of the sixteen different transaction keys. However, each selection group is capable of having and typically has more than one selection set. Thus, selection group A is shown as including selection set 1 and selection set 2. Selection set 1 consists of N different pages and selection set 2 consists of three pages. Execution of the transaction step requested by actuation of the Function select key begins with the assembly of selection set 1 by the applications program 26 within the host 12 and the communication of the selection set to the terminal 14. The terminal then displays page 1 of selection set 1 requesting a reply by the consumer. If the consumer sends a particular reply designated REPLY 1 in FIG. 11, the terminal sends the reply to the host and the host may send selection set 2. The terminal then displays page 1 of selection set 2. Depending on the consumer reply, the host may send further selection sets of the selection Group A until the transaction step is completed.

When an interactive key is actuated, direct communication between the host 12 and the consumer takes place. The terminal 14 essentially acts as an intermediary for an informational exchange between the host and the consumer. The content of the information presented to the consumer and the consumer's response are unknown to the terminal 14 in most instances. When an interactive key is actuated, the terminal 14 initiates a transmission requesting a selection set from the host 12. Upon receipt of the selection set (selection set 1 in FIG. 11) the terminal 14 displays the first page of the selection set. If there is more than one page in the set, the consumer can view the next page of the set by depressing the CHANGE key. Depending on the number of pages in a selection set and the number of pages included in the first host transmission, a paging request may cause the terminal-host interchange to get additional pages of the selection set. If the consumer makes a paging request on the last page of a selection set, and the entire selection set in contained in one transmission from the host, the terminal will return to and display the first page of the selection set. Otherwise the terminal will request additional pages from the host.

The applications program 26 within the host 12 defines the minimum and maximum number of characters to be entered by the consumer for each selection set. If the number of characters entered exceeds the maximum permitted by the particular terminal used, the terminal 14 ends the transaction after retries and sends an interactive status message to the applications program 26. The host 12 also specifies the location on the multiline display 34 at the terminal 14 where the consumer entered data is to be displayed as it is keyed. After determining the information to be entered, the consumer enters the data via the terminal keyboard. If a mistake is made while entering the data, the consumer may use the CORRECTION key to erase the previously entered data and the data then may be reentered.

If the host 12 has sent a validation list to the terminal, the terminal 14 performs validation by searching the list for a comparison with consumer entered data. If the consumer entered data is not on the validation list, an error is indicated and the consumer is asked via another display message to enter another number. If the consumer entered data is on the validation list and no substitution data was sent with the validation list, the consumer entered data is used as is.

The applications programs 26 can specify that a verification message be displayed at the conclusion of data entry by the consumer. The verification display includes the consumer entered data and requests the consumer to signify whether the information is correct or incorrect, or to cancel the transaction. If correct, the consumer presses the OK key. If incorrect, the consumer pressed the CORRECTION key which returns the consumer to the data entry phase and the terminal 14 displays the page of the selection set which was active before data entry was completed. The consumer uses the CANCEL key to terminate the transaction. The CANCEL key can be used at any time during the interactive process to terminate the transaction. Once verification is complete, the terminal 14 transmits the consumer response to the applications program 26. The applications program 26 uses the consumer's response to determine what to do next. It can either continue the selection group by sending another selection set or terminate the selection group by indicating that it is complete. If the selection group is complete, transaction processing continues within the terminal 14. If additional transaction steps are required, these are performed.

As previously noted a validation list can be sent by the host for comparison with the consumer data entry. If the validation list is accompanied by substitution data and the consumer data entry is found on the validation list, then following verification a substitution process occurs in which the substitution data is substituted for the consumer entered data prior to communication to the host 12. Validation and substitution are useful in certain transactions such as cash issue. In the case of cash issue the consumer is asked to enter a number from the display message corresponding to the denomination of bills to be withdrawn. If the number entered by the consumer is on a validation list, then substitution data can be used to replace the consumer entered number with the bill denomination, thereby avoiding a separate amount entry step.

Throughout the interactive process the applications program 26 within the host 12 is responsible for the number and sequence of interactions, the content and format of each interactive message and the acceptability of each consumer response. The application may be as simple as a single interaction or as complicated as processing a repetitive interactive sequence or a complex decision tree.

FIG. 12 depicts the different types of communication steps involved in an interactive transaction. Following a card entry step 350 consumer identification is accomplished by financial institution table processing in a step 352 followed by personal identification number processing in a step 354. As previously described in connection with FIGS. 3 and 5, FIT processing 352 is accomplished by searching the financial institution table 100 within the terminal 14 for an entry corresponding to the card entered. Upon location of the corresponding entry the proper key set table is selected and the proper encryption key is located for subsequent verification of the consumer's identity during PIN processing 354. In the event a corresponding entry in the financial institution table 100 within the terminal 14 cannot be found, the terminal 14 sends a VFIT transaction request to the host 12 for search of a virtual financial institution table at the host 12. If a corresponding entry is found within the virtual financial institution table at the host 12, the corresponding fields are sent to the terminal 14 as part of a VFIT transaction reply. Thereafter the terminal 14 communicates a virtual financial institution table status message to the host 12. The manner in which a virtual financial institution table within the host is used is described in detail in previously referred to copending application Serial No. 882,529, of Anderson et al.

The general interactive protocol is shown by the next four steps designated 356, 358, 360 and 362 in FIG. 12. During these steps the consumer in effect tells the host 12 what it would be like to do. The Function selection step 356 represents actuation of one of the Function keys 108 of the keyboard of FIG. 4. This initiates a transaction and comprises the first step thereof. The From Account selection step 358 represents actuation of one of the From Account keys 110 of the keyboard of FIG. 4. This may occur, and if so comprises a second step in the transaction. The To Account selection step 360 represents actuation of one of the To Account keys 112 of the keyboard of FIG. 4, comprising a possible third step in the transaction. During a given transaction, up to all three of the steps 356, 358, and 360 may be required. Each individual step 356, 358, or 360 results in the terminal 14 preparing and communicating to the host 12 an interactive start message, to which the host 12 responds by communicating an interactive display message including a selection set to the terminal 14. The consumer's response is communicated as an interactive response message to the host 12. The host 12 may send and interactive display message with a further selection set in response to each interactive response from the terminal 12, or it may send an interacitve completion message to the terminal 14 to terminate the transaction step. In a further step of the transaction designated "amount selection" 362, the consumer enters an amount in connection with one or more of the steps 356, 358 and 360.

Upon completion of the amount selection step 362 the consumer has sent to the host 12 information describing the transaction he wishes to have executed. The following steps 364, 366 and 368 shown in FIG. 12 enable the host 12 to supervise the transaction request by first determining what is possible and thereafter carrying out the transaction. In the first such step 364 the terminal 14 sends a formal request to the host 12 in the form of a transaction request message. The transaction request message which was shown and described in detail in FIG. 9 contains any necessary information not previously communicated to the host 12. The host responds by communicating a transaction reply message to the terminal 14, which reply is processed by the terminal 14 in the step 366. The terminal 14 communicates information as to the status of the transaction to the host 12 in the form of a transaction status message in the final step 368.

The transaction request, reply and status messages shown in FIG. 12 are used in the case of each transaction regardless of whether one or more of the steps of the transaction request message was described in detail in connection with FIG. 9 is prepared and sent by the terminal 14 to the host 12 when the terminal 14 determines that the necessary information for the transaction has been gathered. This typically requires at least one and up to all four of the selection steps 356, 358, 360 and 362 shown in FIG. 12. Each of these selection steps involves a key which may be standard, data entry or interactive.

In the case of most transactions all of the data required by the host 12 to process the transaction is included in the transaction request message. In such instances it is only necessary for the host 12 to indicate in the transaction reply message to the terminal 14 that the transaction is approved by the host and is being processed. Occasionally, however, the applications program 26 within the host 12 determines that the data sent with the transaction request is insufficient. Such an occasion may arise, for example in a case where a consumer has more than one checking account. After using the FROM CHECKING key, a transaction request message is prepared indicating to the host that funds are to be transferred from a checking account of the consumer. The applications program 26 then determines that the particular consumer has more than one checking account, thereby requiring further information in the form of identification of the particular checking account from which the funds are to be transferred. In this example and in certain other situations where the host requires additional information, the host 12 may include a display message requesting consumer entry of the needed data as part of the transaction reply message to the terminal 14. Alternatively, the host 12 can initiate an entire interactive sequence with the terminal 14 by sending an interactive message to the terminal requesting an interactive response message in return. Where a display requesting additional consumer entered data is sent as part of the transaction reply message, the display message is accompanied by data enabling the terminal to test the consumer's response.

For example, where the display message requires the consumer to select item 1, 2, 3, 4 or 5 of the display, such data would prevent the terminal from accepting a consumer response such as "10" or "20". When the terminal 14 determines that the consumer response to the display message is valid, such response is included as part of the transaction status message to the host 12 which terminates the transaction.

The various host-terminal intercommunications described in FIG. 12 can be better understood by considering the various steps of an interactive sequence which such messages form a part of. Such steps include the following:

1. A consumer, after entering his card and personal identification number, presses an interactive key at the terminal 14.
2. The terminal 14 recognizes the need for an interaction and generates an interactive start message to the host 12. The message includes the consumer key entry, personal identification number check data and card data.
3. The interactive start message is received by the message processor 24 within the host 12. The processor 24 relays the message to the applications program 26.
4. The applications program 26 determines whether or not this is a valid consumer, and if it is, whether there is access to the consumer's information files in the files 30. If this is not a valid consumer, then an interactive completion message is sent to the terminal 14 instead of an interactive display message. The completion message results in the transaction being terminated.
  a. If the consumer is determined to be valid but the applications program 26 does not have access to the consumer's files, then the program may record the key entered, interpreting it on the simplest level (i.e. savings represents only one savings account) and sending an interactive completion message to end the interaction but not the transaction.
  b. If the consumer is determined to be valid and the applications program 26 has access to the consumer's files, then the program prepares a series of custom displays 28 for the consumer listing all available options.
5. The message processor 24 prepares the custom displays for transmission to the terminal 14. If the custom displays cannot be sent in one interactive display message, a series of interactive display messages which include the custom displays is prepared. The host 12 then sends the first interactive display message to the terminal 14.
6. The terminal 14 displays the custom display to the consumer.
7. The consumer responds by either selecting an item on the display or entering a change display response.
8. If the terminal 14 runs out of custom displays, it sends an interactive response message to the host 12 requesting additional custom displays.
9. The message processor 24 in the host 12 sends the interactive display messages of step 5 above and the terminal 14 sends the interactive response messages requesting more custom displays as enumerated in step 8 above as long as the message processor 24 has displays to send and the consumer wishes to see them before selecting an item displayed.
10. When the host 12 recognizes the terminating condition (i.e. a consumer selects an item or it determines the information sent is incomplete), the message processor 24 sends an interactive completion message to the terminal 14.
11. The terminal 14 moves on to the next transaction step when it receives the interactive completion message.

The interactive completion message may additionally contain a series of transaction definition fields which can alter the execution of subsequent transaction steps, such as eliminating the need for a From Account step if the step information was collected during a Function key interaction. This feature allows dynamic optimization of transaction flow.

An interactive start message is sent each time the terminal 14 wishes to initiate an interaction with the host 12. Interactions are allowed at three transaction steps: Function select, From Account select, and To Account select. In addition the host can initiate an interactive sequence by so specifying in the transaction reply. The terminal 14 sends an interactive start message when a key defined as interactive is entered. The major fields of an interactive start message are:
1. PIN fields, which include the consumer-entered PIN and the number of attempts the consumer made to enter his PIN.
2. Card data fields, track 2 and/or track 3, depending on FIT specifications (card data data will be included only in the first interactive start of a transaction).
3. Transaction information fields, such as:
  a. Information on the Function Select, To Account or From Account select key initiating the interactive start.
  b. The subclass associated with the active function select key.
  c. The language ID and institution message identifier used with this FIT entry.
  d. Sequence numbers; the interactive sequence number which is unique for each message sent from the terminal 14, and the transaction sequence number which is the same as the one that will be in the transaction request associated with this interaction.

Since interactive start messages are sent prior to a transaction request message, the host 12 may need to perform PIN validation after receiving the first interactive start message if terminal PIN validation was not specified.

FIG. 13 shows the format of an interactive start message communicated from the terminal 14 to the host 12 to begin an interactive transaction. Following an L field 380 which denotes the length of the message, an ISN field 382 provides the interactive sequence number. The interactive sequence number is included in all interactive messages transmitted between the terminal 14 and the host 12. It begins with 1 when the system is reset and it is incremented by 1 for each interactive start, interactive response and interactive status sent to the host 12. The host 12 uses the last interactive sequence number received from the terminal 14 in the interactive display and interactive completion messages. The interactive sequence number increases from 1 to 255, then begins again with 1.

A following C field 384 gives the class of the message which is "02" and a subsequent SC field 286 denotes the subclass of the message which is "01". A VAR field 388 which follows the SC field 386 provides a copy of the interactive sequence number.

A following TSN field 390 provides the transaction sequence number. When the host 12 is first notified that a transaction is in progress, the transaction sequence number is incremented and placed in the notifying communication message. All succeeding terminal-to-host interactive and transaction messages associated with the transaction contain the same transaction sequence number. If no interactive message sequence is required during the data collection phase of the transaction, the updated transaction sequence number first appears in the transaction request message. If an interactive message sequence is required, the updated transaction sequence number first appears in the initial interactive start message associated with the transaction. Each succeeding interactive start, response and status message contains the same transaction sequence number but a different interactive sequence number. The transaction request message contains the same transaction sequence number as present in the interactive messages. The transaction sequence number can be used to tie interactive messages to their associated transaction request message. If an interactive transaction is terminated before a transaction request has been sent, the transaction sequence number associated with the initial terminal to host message of the next transaction is one greater than the transaction sequence number associated with the terminated transaction.

The following PIN field 392 denotes the personal identification number on the consumer. This is followed by a PIN TRY field 394 denoting the number of consumer PIN entry attempts that were made. Following the PIN TRY field 394 is a FLAG field 396. Bit 0 of this field indicates whether T2 is good, while bit 1 of this field indicates whether T3 is good. Bit 2 of the FLAG field 396 indicates if the PIN retry limit was reached while bit 3thereof denotes PIN TRY override failure. Bit 5 of the FLAG field 396 denotes that the PIN is unchecked, while bit 6 indicates the presence of a two track card. A following TRANS SC field 398 provides the transaction subclass which is the subclass associated with the active function key.

An INTERACTIVE KEY field 400 provides the code number of the key triggering the interactive request. The numbers X'11'-X'18' denote the eight Function select keys 108. The numbers X'21'-X'24' denote the four From Account keys 110. The numbers X'31'-X'34' denote the four To Account keys 112. If an alternate key code has been defined for the key in the key set table, the alternate key code is sent in place of the standard key code.

The following LID-IMI filed 402 contains a 2-byte language table entry identifier field being used for this particular consumer. The first byte denotes the LID or language ID value obtained from the financial institution table entry or from the credit card or from the consumer's response to a display requesting selection. The second byte denotees the IMI or institution message identifier which is a value obtained from the financial institution table entry being used.

Following a field separator field 404, a T2 DATA field 406 sets forth the data recorded in the T2 track of the credit card if such data is present. A following field separator field 408 separates the T2 DATA field 406 from a T3 MAP field 410 which is the track 3 data map field. A following T3 DATA field 412 contains the track 3 data, if present. The interactive start message is terminated by a field separator field 414.

Upon receipt of the interactive start message by the host 12, the message processor 24 relays the interactive start message to the applications program 26. The applications program 26 responds by generating an interactive display message including one or more custom displays and communicating such message via the message processor 24 to the terminal 14. The format of such an interactive display message is shown in FIG. 14.

The host 12 sends an interactive display message to the terminal 14 when it has consumer selection items or option data to display to the consumer. The host 12 is responsible for formatting the information for the display, defining the amount of consumer data entry expected, and controlling the interaction in general.

The Major fields of an interactive display message are:

1. Display related fields which include:
   A. The actual page or screen definition data. This data may be customized page definitions or identification numbers calling out page definitions which reside in the terminal. There may be several pages in a message and there may be a mixture of customized and terminal resident pages in a display message.
   B. An indication of whether the entire selection set is included in the interactive display message.
2. Consumer data entry field, which defines the minimum and maximum length of the consumer entry data.
3. Verification field, which allows the host to to include or identify a special verification message to use with a selection set and thus override the use of a default verification message. The host may also indicate that no terminal verification need take place.
4. Validation/Substitution fields which define a validation list to be searched by the terminal in response to a consumer data entry to determine if such entry is valid or erroneous and substitution data to be substituted for the consumer entered data in the event a match is found in the validation test.

The fields of the interactive display message of FIG. 14 include an L field 440 denoting the length of the message, an ISN field 442 providing the interactive sequence number which is copied from the last ISN received by the host, a C field 444 denoting the class of the mesage which is "0E" and an SC field 446 denoting the subclass which is "01". A following VAR field 448 provides a copy of the interactive sequence number.

The VAR field 448 is followed by an ID MSG FLAG field 450 which is an interactive display message flag. If bit 8 of this flag has the value "0", this denotes that the host 12 should be contacted for more pages if the consumer enters a change key on display of the last page of the message. If this same bit has the value "1" this denotes that the terminal should wrap to the first page of the display message if the consumer enters the change key on the display of the last page of the message. Bit 9 of this flag, if on, indicates that a verification step should occur after a consumer data entry. Bit 10 of this flag, if on, indicates that the decimal point is being used as a data delimiter (i.e. not a dollars and cents indicator). Bit 11 is a format standardization bit which insures that there are two digits following a decimal point in the amount by adding zeros if necessary. Bit 12 indicates whether consumer data entry is expected. Bit 13 indicates whether or not the substitution data consists of transaction definition bytes. Bit 14 indicates whether or not the transaction is to be cancelled.

The ID MSG FLAG field 450 is followed by a MIN CDEL field 452 and then an MAX CDEL field 454. The MIN CDEL field 452 specifies the minimum consumer data entry length for the selection set. The MAX CDEL field 454 specifies the maximum consumer data entry length for the selection set. If MIN=MAX=0, the only data entry allowed is the "OK" key or another control key. An LP field 456 indicates the total length of page definition data which follows. The page definition data consists of one or more pages, each of which is defined by a page flag field 458 and a page data field 460. Bit 0 of the page flag field 458 comprises a resident page flag. Bit 1 of the field is a verification page flag. If a verification page is present, it must be the first page in the selection set. The page data field 460 is of variable length and may consist of a length indication followed by a text stream.

Where validation or substitution data is present in the interactive display message, the last page data field 460 is followed by an LVS field 462 identifying the presence of such data and an LV field 464 indicating the presence and length of a following VALIDATION DATA field 466 which is of variable length and which contains validation data. If substitution data is also present, a following LS field 468 identifies the presence and length of a following SUBSTITUTION DATA field 470 which is of variable length and which contains substitution data to be used with the validation data of the field 466. There can be "N" sets of validation and substitution data, each of which includes the LV field 464, the VALIDATION DATA field 466, the LS field 468 and the SUBSTITUTION DATA field 470.

Within the page data field 460 the page ID is the resident page or message table ID number. Page numbers from 1 to 255 are available for display messages and numbers from 1 to 125 are available for printer messages. The following length indication and text stream of the page data field 460 are shown in FIG. 15. The first field 490 thereof denotes the length of the text stream. The fields following the field 490 comprise the text stream. In the example of FIG. 15 the text stream is comprised of three different text and display format control fields 492, 494 and 496 of variable length. The fields 492 and 494 are separated by an RS CODE POINT X'28' field 498 indicating that a resident message segment stored in the segment table of the terminal is to be inserted between the fields 492 and 494. An RES SEG ID field 500 following the field 498 identifies the segment resident in the segment table of the terminal which is to be inserted between the fields 492 and 494. The fields 494 and 496 are separated by a CDES CODE POINT X'29' field 502 which indicates that consumer entered data is to be inserted between the fields 494 and 496.

Each of the text and display format controls fields 492, 494 and 496 comprises displayable characters in the form of EBCDIC code points not assigned as control characters together with display format control characters.

The display format control characters and the function represented thereby are as follows:

| Function | Control Character | Explanation |
| --- | --- | --- |
| Line Feed | X'25' | The next character position is down one row. The horizontal position is unchanged. If Line Feed is detected while on the last row of the screen, it will cause a wrap to the first row of the screen. |
| Return | X'0D' | The next character position is position 1 on the current display row. |
| New Line | X'15' | The current row is erased from the current position to the end of the row. The next character position is position 1 of the next lower row. If new line is detected while on the last row of the screen, the next character position is position 1 of the first row of the screen. |
| New Page (form feed) | X'0C' | The screen is completely erased; the next character position is position 1 of row 1. |
| Position | X'34' | This control character is followed by a flag byte in a 1-byte positioning value. Flag byte: Bit 4: 0 = position is absolute. 1 = position is relative. Bit 5: 0 = position change is horizontal. 1 = position change is vertical. Bits 6-7: 00 = move to new character position without erasing. 01 = erase from the current position the number of bytes specified by the position byte. 10 = move to new character position and erase the old position up to, but not including, the new position. The positioning byte indicates a row or character column number. It contains an unsigned binary value ranging from 0-255 to be used under direction of the flag byte; a 0 results in no operation. The value specified is divided by a modulus number to determine the resulting position. The modulus division produces a change of 1 to x rows for vertical positioning, and a change of from 1 to y character columns for horizontal positioning, where x is the maximum number of rows on a screen, and y is the maximum number of character columns in a row. |

Referring again to FIG. 3 it will be noted that within the terminal 14 the processor 60 is coupled to a message table 510, a segment table 512 and a consumer entered data table 514. Messages communicated to the terminal 14 form the host 12 during initialization are stored in the message table 510. Thereafter the processor 60 controls accessing of the messages in the table 510 for display by the multiline display 34 as the various operations of the transaction are sequenced through. Data entry keys utilize the standardized messages stored in the table 510. During execution of an interactive transaction the host can either utilize the messages stored in the table 510 or it can generate its own custom messages. Commonly used portions of messages are stored in the segment table 512. Each segment comprises a plurality of displayable characters and a plurality of display format control characters for the displayable characters in the same fashion as the fields 492, 494 and 496 of FIG. 15. However the segments do not have to be communicated with or stored with the rest of the display message. Instead, the display message as communicated or stored includes pairs of fields such as the RS CODE POINT X'28' field 498 and the RES SEG ID field 500. The field 498 which comprises the control character X'28' indicates that the following byte is a resident segment ID. The RESIDENT SEGMENT ID field 500 identifies which of the segments stored in the segment table 512 is to be inserted between the fields 492 and 494. During display of the message at the multiline display 34, the processor 60 of FIG. 3 inserts the displayable characters and the control characters therefor comprising the segment from the segment table 512 between the fields 492 and 494 of the message of FIG. 15.

During execution of a transaction, data entered by the consumer is routed by the processor 60 of FIG. 3 to the consumer entered data table 514 where it is stored. Display of the consumer entered data stored in the table 514 is accomplished by inserting the consumer entered data at an appropriate place within a message communicated from the host 12 to the terminal 14 or stored in the message table 510. Insertion of consumer entered data between the fields 494 and 496 in the message of FIG. 15 is provided by the CDES CODE POINT X'29' field 502. The presence of the control character X'29' in the field 502 causes the processor 60 to insert consumer entered data from the table 514 as the message of FIG. 15 is being displayed on the multiline display 34.

The interactive display message of FIG. 14 communicated by the host 12 to the terminal 14 is displayed to the consumer and requests data entry by the consumer. The consumer entered data results in an interactive response message being assembled by the terminal 14 and communicated to the host 12. The interactive response message contains either the data the consumer has entered in response to the display of a selection set or a paging indication in the case where an incomplete selection set has been sent and the consumer wishes to view additional pages of a selection set. The major fields of an interactive response message include consumer entry fields and an informational status field.

Displays from a selection set show a consumer a lsit of selection items from which a consumer is expected to make a selection. Depression of the CHANGE key means that no item on the page displayed was desired and that another page of data should be displayed. The procssor 60 will display the next page of the selection set if it is available. A request that more pages be transmitted in an interactive message may be made for an interactive key if no more pages are available at the terminal 14. If the selection set is completely defined at the terminal 14 the first page of the selection set will be redisplayed. For a data entry key the selection set is always completely defined.

Depression of the OK key terminates data entry. An option may be selected where data entries must be terminated by the OK key. This includes depression of the OK key without entering any numerics, which is a null entry, entry of a numeric field of less than the maximum length, as well as entry of a numeric field of the maximum length. If this option is not selected then the OK key will be required only after variable length entries. Data entry will be terminated when the maximum amount of data is entered for fixed length entries, namely when the minimum equals the maximum. The consumer data entry minimum and maximum are established differently for data entry and interactive keys. For data entry keys the minimum and maximum values are established in the key definition table. For interactive keys they are received in the interactive message containing the selection set (display) data. The minimum and maximum values may be different for each selection set for interactive keys since they are established with the definition of the selection set. The minimum and maximum values pertain to the number of characters that may be entered. A decimal point and each numeric digit counts as a character. The minimum value must be greater than or equal to zero and less than or equal to the maximum. The maximum must be greater than or equal to zero and less than or equal to 20. A minimum and maximum value of zero means that no numeric field data is allowed but that the consumer must respond to the display with entry of the OK, CHANGE, or CANCEL key. This setting essentially indicates a view only mode of operation.

During consumer entry of data, any numeric key entry will be accepted. Entering the CORRECTION key will cause the previously entered data to be cleared but data entry is still expected. When data entry is complete it will be checked to insure it falls within the minimum and maximum values established for the key. If the entry is out of range an error message will be displayed and the page viewed by the consumer at the time he entered data will be redisplayed. Data may then be reentered. If a validation list is present for the consumer data entry, the data entry is checked against the list to determine if the consumer data entry is valid or erroneous. If the consumer data entry is found in the validation list and substitution data is present, the substitution data is then substituted for the consumer entered data.

The format of an interactive response message is shown in FIG. 16. The message of FIG. 16 includes an L field 550 denoting the length of the message, an ISN field 552 containing the interactive sequence number, a C field 554 denoting the class of the message which is "03", an SC field 556 denoting the subclass of the message which is "01", a VAR field 558 which is a copy of the interactive sequence number, a TSN field 560 which is the transaction sequence number and an IR FLAG field 562 which provides an interactive response flag. If bit 0 of the field 562 is "0" it denotes consumer data entry transmission, and if "1" it denotes a page request indicating that another page of this selection set is requested.

Following the IR FLAG field 562, an LN field 566 denotes the length of a following consumer data entry field 568. The CONSUMER DATA ENTRY field 568 which is variable in length comprises keyboard data in EBCDIC form entered by the consumer in response to the display of pages received by the terminal in the last interactive display message. It may be the substitution data. In a remaining PAD field 570 characters X'F' are added as needed to make the message length even and at least 12 bytes long.

After consumer data entry a verification step will be executed if indicated. For data entry keys, the key definition table specifies whether the option is selected and, if selected, the verification page identifier. For interactive keys this information is received in the interactive message containing the selection set data. In this case the verification message may be a page identified or a custom-defined verification message.

A verification message redisplays the data that a consumer entered so that he may verify that it is correct before going on to the next step. The verification message may be formatted in such a way that the consumer selection items from the display page are left on the screen along with the display of the data that was entered. Formatting of the verification message, like all other display messages, is under host control. A consumer may enter OK, CORRECTION or CANCEL. The OK key indicates the data entered is acceptable. CORRECTION indicates the data was invalid; the terminal 14 will then display the page displayed at the time of data entry so that the data may be reentered. CANCEL causes a termination of the transaction. Depression of previously active Function, From Account and To Account keys is a branch back situation. However, the transaction is not terminated; processing simply proceeds from the step branched to. Entry of the CHANGE or numeric keys will be ignored. If validation and substitution data were sent in connection with a display message, the validation list is searched and, if a match is found, the substitution data is substituted for the consumer entered data.

When the host 12 determines that an interactive transaction is complete, it generates and sends to the terminal 14 an interactive completion message. Receip of this message causes the terminal 14 to carry out any actions indicated by the message and, if a non-error completion, proceed to the next transaction step. The major fields of an interactive completion message include display related fields. The screen definition rules are as described for the display related fields of the interactive display message. However, additional pages of display data cannot be obtained from the host. Further major fields of the message include consumer data entry fields as defined for interactive display messages. Any data entered at this point will be sent to the host as part of the transaction request message. Still further fields of the message include verification and validation/substitution fields as defined for interactive display messages. The substitution field may contain transaction definition bytes which for a function select step can be used in lieu of the original transaction definition bytes for the particular function key involved for the duration of the transaction.

The format of an interactive completion message is shown in FIG. 17. The first five fields of the message of FIG. 17 are identical to the fields 550, 552, 554, 556 and 558 respectively of the message of FIG. 16, with the exception that the message class is "OF" in the case of FIG. 17.

The VAR field is followed by an IC MSG FLAG field 580 which is an interactive completion message flag. Bit 0 of the field indicates whether display data is present. Bit 1 indicates whether transaction definition bytes are present. If display data is present, bit 8 notes that the system is to return to the first page of the display message contained in the completion message if the CHANGE key is actuated on display of the last page of the message. Bit 9 notes whether there is a verification step after consumer data entry. Bit 10 notes if the decimal point will be used for an amount entry or as a data delimiter. Bit 11 is a format standardization bit which insures that there are two digits following a decimal place in an amount by adding zeros if necessary. Bit 12 indicates whether consumer data entry is expected.

The following MIN CDEL and MAX CDEL fields 581 and 582 respectively define the minimum and maximum length that consumer entered data can have. These fields are ignored if no consumer data is required.

In the LP field 583 the total length in bytes of the page definition data is given. The following PAGE FLAG field 584 comprises a page flag. Bit 1 of this field denotes a resident page flag.

The PAGE FLAG field 584 is followed by a PAGE DATA field 586. The PAGE DATA field 586 consists of display information which may require consumer data entry. The data itself is arranged in the form shown in FIG. 15. A plurality of pages can be present, each being designated by a separate PAGE FLAG field and a following PAGE DATA field.

Although not shown in FIG. 17, the PAGE DATA field 586 of the interactive completion message may be followed by validation and substitution data in the form of one or more of the groups of four fields 464, 466, 468 and 470 shown in FIG. 14. In addition, the SUBSTITUTION DATA field 470 can contain three TRANSACTION DEFINITION BYTES shown as a separate field 587 in FIG. 17. Bit 1 of the PAGE FLAG field 584 denotes whether a TRANSACTION DEFINITION BYTES fields 587 is present in substitution data.

In the first byte of the TRANSACTION DEFINITION BYTES field 587, bit 0 indicates whether a special step is required, which indication is ignored in the case of an interactive mode. Bits 1, 2 and 3 respectively indicate whether From Account, To Account, and Amount/Verify steps are required. Bit 4 indicates whether this is a "fast cash" key. The first four bits of the second byte respectively indicate whether a deposit statement, a deposit step, cart. 1 and cart. 2 are required. The fifth bit indicates whether chaining is allowed. The third byte denotes the subclass. It will be recalled that the three transaction definition bytes can be used in place of the bytes previously stored at the terminal during initialization for the remainder of a transaction involving a Function key.

The terminal 14 transmits an interactive status message to the host 12 when a non-closing exception condition occurs after at least one interactive message has been sent to the host. The message is sent to allow the host 12 to perform any necessary reinitialization or any termination procedures. If no interactive start message has been sent and a non-closing exception occurs, no interactive status will be sent. Status in this message is broken into three parts:

1. The first part divides exceptions into eight major categories.
2. The second part further divides the category into eight subcategories.
3. The third part is a descriptor code which defines the conditions within the subcategory.

If multiple exceptions are present, only the first will be reported (processing is discontinued on detection of an exception).

Examples of non-closing exception conditions which can cause an interactive status message to be sent include consumer cancel, consumer timeout on data entry, and an invalid message format on interactive messages received by the terminal 14. These conditions will cause termination of a transaction. An interactive status message will also be sent when a "branch back" situation occurs after an interaction has taken place. This will not cause a termination of a transaction.

Referring to FIG. 18 which shows the format of an interactive status message, the first part of the message includes an L field 590 denoting the length of the message, an ISN field 592 providing the interactive sequence number, a C field 594 denoting the class of the message which in this instance is "16", an SC field 596 which denotes the subclass which is "01", a VAR field 598 which provides a copy of the interactive sequence number and a TSN field 600 which provides the transaction sequence number.

An INTERACTIVE TRANSACTION TERMINATION STATUS field 602 follows the TSN field 600. As noted above, this field is broken into three parts. The first part divides exceptions into eight major categories. The second part further divides the category of exceptions into eight subcategories. The third part is a descriptor code which defines the conditions within the subcategory. The various different sets of data which can be denoted by the three different bytes of the interactive transaction termination status field 602 are as follows:

INTERACTIVE STATUS

| Byte 0 Bit | Meaning | Byte 1 Bit | Meaning | Byte 2 Code | Meaning |
|---|---|---|---|---|---|
| 0 | Reserved | 0–7 | Reserved | X'00'–X'FF' | Reserved |
| 1 | Reserved | 0–7 | Reserved | X'00'–X'FF' | Reserved |
| 2 | Transaction Termination Condition | 0 | Abort Condition | X'00' | Reserved |
|   |   |   |   | X'01' | Consumer Action |
|   |   |   |   | X'02' | Alarm Condition |
|   |   |   |   | X'03' | Hardware Error |
|   |   |   |   | X'04'–X'FF' | Reserved |
|   |   | 1 | Message format error | X'00' | Reserved |
|   |   |   |   | X'02' | Length mismatch. The total length of an interactive message is less than it should be. |
|   |   |   |   | X'03' | Reserved |
|   |   | 2 | Message content error | X'00' | Reserved |
|   |   |   |   | X'01' | CDEL min > CDEL max |
|   |   |   |   | X'02' | CDEL max > 20 |
|   |   |   |   | X'03' | Wrong ISN received |
|   |   |   |   | X'04' | Page length error |
|   |   |   |   | X'05' | Invalid subclass in message header |
|   |   |   |   | X'06' | Transaction defn. byte error (request to turn on bit which is off, or change subclass to an invalid value; or present in FA or TA step) |
|   |   |   |   | X'07' | Incomplete selection set in data entry mode. |
|   |   |   |   | X'08'–X'FF' | Reserved |
|   |   | 3 | Host/ subhost request | X'00' | Reserved |
|   |   |   |   | X'01' | Suspended |
|   |   |   |   | X'02'–X'FE' | Reserved |
|   |   | 4–7 | Reserved | X'00'–X'FF' | Reserved |
| 3 | Notification status | 0 | Branch Back | X'00' | Reserved |
|   |   |   |   | X'01' | Funct. select step |
|   |   |   |   | X'02' | From-account step |
|   |   |   |   | X'03' | To-account step |
|   |   |   |   | X'04'–X'FF' | Reserved |
|   |   | 1–7 | Reserved | X'00'–X'FF' | Reserved |
| 4–7 | Reserved | 0–7 | Reserved | X'00'–X'FF' | Reserved |

As noted in connection with FIG. 12 actuation of an interactive key within the Function keys 108, the From Account keys 110 or the To Account Keys 112 shown in the keyboard configuration of FIG. 4 produces an interactive start message to the host 12 followed by an interactive display message to the terminal 14, an interactive response message to the host 12 and an interactive completion message to the terminal 14. The formats of these messages were described in connection with FIGS. 12-17. The interactive sequence can therefore be summarized as follows:

1. The consumer presses an interactive key.
2. The terminal 14 sends an interactive start message with the necessary information to the host 12.
3. The host 12 transmits screen data containing additional options to the terminal 14 for display to the consumer in an interactive display message.
4. The consumer responds to the data displayed either by selecting an item or by indicating that additional items be displayed. The terminal 14 transmits either the consumer data or the request for more items (paging) in an interactive response message to the host 12.
5. When the host 12 wishes to end the interactive sequence, it sends an interactive completion message to the terminal 14.

Steps 3 and 4, the sending of the interactive display and the interactive response messages, may be repeated as many times as necessary before the interactive completion message is transmitted. There is no maximum on the number of interactive displays. However, if the host 12 has no option data to present to the consumer, it may send an interactive completion message immediately after receiving the interactive start message without sending any interactive display messages. This message may contain display data. After receiving the interactive completion message, the terminal 14 proceeds to the next step in the transaction sequence. Interactions may occur in none, one, two or all three of the transaction steps which allow interactions. An interaction may also be initiated by the host at the time the transaction reply message is received by the terminal.

If error and exception conditions that can terminate a transaction occur after an interactive start message has been sent, but before the transaction request has been sent, an interactive status message describing the terminating condition is transmitted by the terminal 14 to allow the host 12 to take the appropriate termination actions. A typical interactive status message was described in connection with FIG. 18. The interactive status message is also sent when the consumer causes a "branch back" situation after an interaction has occurred. A branch back situation occurs when a consumer selects a key for a prior transaction step rather than a key for the transaction step he is on or selects another key in the same step he is on. The applications program 26 is signaled so that data collected during an interaction that may be invalidated by the reentry of a transaction step can be reinitialized.

Examples of non-closing exception conditions that can cause the interactive status message to be sent are:
1. Consumer cancel.
2. Consumer timeout on data entry.

3. An invalid message format on interactive messages received by the terminal.

An interactive status message is also sent when a "branch back" situation occurs after an interaction has taken place. This does not cause a termination of a transaction.

While the invention has been particularly shown and described with reference to a preferred embodiment thereof, it will be understood by those skilled in the art that various changes in form and details may be made therein without departing from the spirit and scope of the invention.

What is claimed is:

1. A terminal for use in a transaction execution system which is shared by a plurality of institutions, which transaction execution system includes said terminal in communication with a host data processing system, said terminal comprising:
   input means operable by a customer for entering transaction data, said input means including a plurality of transaction keys representing different transaction steps selectively actuatable by said customer;
   display means for displaying messages to said customer;
   means responsive to institution identification data entered by said customer for designating selected ones of said plurality of transaction keys as interactive keys;
   means responsive to actuation by said customer of a first specific transaction key designated as an interactive key for starting an interactive transaction by communicating to the host data processing system an interactive start message; means for executing an interactive transaction, including first means for receiving from the host data processing system for display at said display means an interactive display message requesting customer entry of data at the terminal; and second means for selectively communicating to the host data processing system an interactive response message including data entered by said customer in response to said interactive display message.

2. The terminal of claim 1, wherein said means for designating further comprises means for designating one or more specific transaction keys as data entry keys; and terminal further comprising means responsive to actuation by said customer of a second transaction key disgnated as a data entry key for providing for display at said display means a data entry message requesting entry by said customer of data at the terminal; and means enabling said customer to respond by selectively cancelling the actuation of said second transaction key, requesting a further data entry message, or entering data.

3. The terminal of claim 2, wherein said display means includes means for storing at least one message associated with each of at least some of the plurality of transaction keys, means responsive to actuation of a transaction key designated as a data entry key in conjunction with entry of institution identification data for selecting a message associated with the actuated key, said display means being responsive to selection of a message for communicating the selected message to said customer at the terminal, and means for detection of customer actuation of at least one key in response to communication of a message to said customer.

4. The terminal of claim 3, wherein the means responsive to institution identification data entered by said customer for deisgnating one or more specific transaction keys as data entry keys includes at least one key set table including a different definition for each of at least some of the different keys, each difinition including an indication of whether verification of data entered at the terminal by a customer is to be required, a verification message for communication to a customer, and a list of messages for communication to a customer.

5. The terminal of claim 1, wherein the terminal further comprises means for receiving from the host data processing system an interactive completion message for terminating an interactive transaction; means for communicating a transaction request message to the host data processing system in response to said interactive completion message; and means for receiving from the host data processing system in response to said transaction request message selectively a display message requesting the entry of further needed data accompanied by test data for testing data entered by the customer in response to the request, or an interactive message requesting an interactive response message from the terminal.

6. The terminal of claim 5 further comprising means for storing transaction definition steps for defining the execution of subsequent transaction steps in response to operation of selected ones of said transaction keys, and wherein said interactive completion message selectively includes transaction difinition steps for storage in the means for storing.

7. The terminal of claim 1, wherein said interacitve start message includes an interactive sequence number for associating interacitve messages with related transaction request messages, and wherein the terminal includes means for changing said interactive sequence number for each successive interactive start message.

8. The terminal of claim 1, wherein said second means selectively includes in said interactive response message said data entered by said customer in response to said interactive display message, or a request for a further interactive display message from the host data processing system.

9. A transaction execution system which is shared by a plurality of institutions, the transaction execution system including a plurality of terminals, each said terminal in communication with a common host data processing system, characterized in that
   each said terminal comprises:
   input means operable by a customer of a specific one of said institutions for entering transaction data, said input means including a plurality of keys selectively actuatable by said customer for selecting different transaction steps;
   display means for displaying messages to said customer;
   designating means responsive to institution identification data entered by said customer for designating selected ones of said plurality of transaction keys as interactive keys;
   means responsive to actuation by said customer of an interactive transaction key for starting an interactive transaction by communicating to the host data processing system an interactive start message; means for executing an interactive transaction, including first means for receiving from the host data processing system for display at said display means an interactive display message requesting customer entry of data at the terminal and second means for communicating to the host data processing system an interactive response message in response to said interactive display message; and the host data processing system comprises:
communication means for communicating to said terminal (a) said interactive display message in response to an interactive start message, and (b) information designating which of said transaction keys are interactive transaction keys and which are data entry transaction keys;
storage means for storing information for a plurality of customer accounts and possible transactions; and
means for accessing said storage means for generating said interactive display message and for authorizing transactions with respect to a customer account for said customer.

10. The transaction execution system of claim 9, wherein said terminal includes means for storing a plurality of message segments and said display means further includes means for combining message data communicated from said host data processing system and different ones of the plurality of message segments stored at the terminal.

11. The transaction execution system of claim 9, wherein said second means further comprises means for selectively including in said interactive response message (a) said data entered by said customer in response to said interactive display message, or (b) a request for a further interactive display message from the host data processing system.

12. The transaction execution system of claim 9, wherein said interactive start message includes an interactive sequence number for associating interactive messages with related transaction request messages, and wherein the terminal includes means for changing said interactive sequence number for each successive interactive start message.

13. The transaction execution system of claim 9, wherein said interactive start message includes an interactive sequence number which changes with each new interactive start message communicated from the terminal to the host, a transaction sequence number which changes with each new transaction, and a field identifying the customer operated key designated as interactive.

14. The transaction execution system of claim 9, wherein said interactive display message requires customer response, said interactive display message further including an indication of whether there is at least one other page of information to be displayed which is not included in the present display message and a verification message to be displayed to said customer at the terminal requesting verification of data to be entered by said customer.

15. The transaction execution system of claim 14, wherein the terminal includes means for storing a plurality of pages of information to be displayed and at least one page of information in the display message comprises identification of a selected one of the stored plurality of pages of information to be displayed by the terminal in response to the display message.

16. The transaction execution system of claim 9, wherein the interactive response message includes an interactive response flag, the flag assuming a first state to indicate the presence of customer entered data in the interactive response message and assuming a second state to request that the host communicate a further display message to the terminal.

17. The transaction execution system of claim 9, wherein the host further comprises means for communicating to the terminal an interactive completion message for terminating execution of the interactive transaction, the interactive completion message including a display message requiring no response by said customer or verification by said customer or cancellation of a current transaction by said customer.

18. The transaction execution system of claim 9, wherein the host further comprises means for communicating to the terminal an interactive completion message for terminating execution of the interactive transaction, and the terminal includes means for storing transaction definition steps to be carried out in executing transactions in response to customer actuation of selected ones of the keys, and the interactive completion message includes transaction definition steps to be carried out in executing transactions for storage in the means for storing in the terminal.

19. The transaction execution system of claim 9, wherein the host includes means responsive to any of a first group of the plurality of keys selectively actuatable by said customer for selecting different transaction steps for providing messages to the terminal and processing data received from the terminal in connection with each selected transaction step within the first group, the terminal further including means responsive to any of a second group of the plurality of keys selectively actuatable by said customer for selecting different transaction steps for generating messages and processing data received in connection with each initiated transaction step request within the second group.

20. The transaction execution system of claim 19, wherein the means responsive to any of a second group of the plurality of keys includes means for storage customer entered information at the terminal in connection with each selected transaction step within the second group and means for subsequently transferring the stored customer entered information to the host.

21. The transaction execution system of claim 9, wherein said designating means is further responsive to said identification data for designating at least one of said transaction keys as a data entry transaction key; and further comprising means responsive to selection by said customer of a data entry transaction key (a) for providing for display at said display means a data entry message requesting entry by said customer of data at the terminal; and (b) for enabling said customer to respond to said data entry message by selectively cancelling the selection of said data entry transaction key, requesting a further data entry message, or entering data.

* * * * *